US012753865B2

(12) United States Patent
Pascuzzi

(10) Patent No.: US 12,753,865 B2
(45) Date of Patent: Oct. 6, 2026

(54) METALLIC FLUID TUBE

(71) Applicant: Veritas AG, Gelnhausen (DE)

(72) Inventor: Sergio Pascuzzi, Linsengericht (DE)

(73) Assignee: HDT Veritas Hessen GmbH, Gelnhausen (DE)

( * ) Notice: Subject to any disclaimer, the term of this patent is extended or adjusted under 35 U.S.C. 154(b) by 0 days.

(21) Appl. No.: 18/807,143

(22) Filed: Aug. 16, 2024

(65) Prior Publication Data

US 2025/0067372 A1 Feb. 27, 2025

(30) Foreign Application Priority Data

Aug. 21, 2023 (DE) ..................... 10 2023 122 300.3

(51) Int. Cl.

| | |
|---|---|
| ***F16L 19/02*** | (2006.01) |
| ***F02M 55/00*** | (2006.01) |
| ***F02M 55/02*** | (2006.01) |
| ***F16L 9/02*** | (2006.01) |
| ***F16L 19/025*** | (2006.01) |

(52) U.S. Cl.

CPC ............. *F16L 19/0225* (2013.01); *F16L 9/02* (2013.01); *F02M 55/005* (2013.01); *F02M 55/02* (2013.01); *F16L 19/025* (2013.01)

(58) Field of Classification Search

CPC . F16L 19/0225; F16L 19/025; F16L 19/0212; F16L 19/0231; F16L 19/0286; F16L 19/0283; F16L 19/028; F02M 55/005; F02M 55/02

See application file for complete search history.

(56) References Cited

U.S. PATENT DOCUMENTS

| | | | | |
|---|---|---|---|---|
| 1,235,876 | A * | 8/1917 | Cave | |
| 2,024,215 | A * | 12/1935 | Gillette | F16L 19/0225 |
| 5,060,988 | A * | 10/1991 | Williamson | F16L 19/025 |
| 5,529,349 | A * | 6/1996 | Gibbs | F16L 19/0283 |
| 6,840,283 | B2 * | 1/2005 | Furugen | F02M 55/005 |

(Continued)

FOREIGN PATENT DOCUMENTS

| | | | | |
|---|---|---|---|---|
| DE | 102013110612 A1 * | 3/2015 | | F02M 55/02 |
| DE | 102019125263 A1 | 3/2021 | | |

(Continued)

OTHER PUBLICATIONS

JP-H1068367-A—Machine Translation—English (Year: 1998).*
FR-2860058-A1—Machine Translation—English (Year: 2005).*
DE-102013110612-A1—Machine Translation—English (Year: 2015).*

*Primary Examiner* — William S. Choi
(74) *Attorney, Agent, or Firm* — Flare IP PLLC

(57) ABSTRACT

A metallic fluid tube includes a metallic tube wall having a tube wall inner side which delimits an interior space and a tube wall outer side facing away from the interior space and toward an exterior area. The tube wall has a tube end with a tube opening connecting the interior space with the exterior area. The tube wall has an elevation which runs around the tube wall outer side and is arranged spaced apart from the tube end. The tube wall outer side has a circumferential sealing geometry extending on the tube wall outer side from the elevation to the tube end. The circumferential sealing geometry has turning grooves extending along a groove extension direction that runs transversely to a longitudinal extension direction of the fluid tube.

9 Claims, 6 Drawing Sheets

(56) References Cited

U.S. PATENT DOCUMENTS

| | | | | |
|---|---|---|---|---|
| 8,402,948 | B2 * | 3/2013 | Straub | F02M 55/02 |
| 10,655,763 | B2 | 5/2020 | Berghaus et al. | |
| 2009/0151701 | A1 * | 6/2009 | Kato | F02M 55/005 |
| 2010/0084856 | A1 * | 4/2010 | Wrobel | F16L 19/025 |
| 2011/0121563 | A1 * | 5/2011 | Toyoshima | F16L 19/0225 |
| 2020/0300390 | A1 * | 9/2020 | Verma | F16L 19/0225 |

FOREIGN PATENT DOCUMENTS

| | | | | |
|---|---|---|---|---|
| FR | 2860058 | A1 * | 3/2005 | F02M 55/005 |
| JP | H1068367 | A * | 3/1998 | F02M 55/005 |

* cited by examiner

METALLIC FLUID TUBE

CROSS-REFERENCE

This application claims the benefit of German Patent Application No. 10 2023 122 300.3, entitled "METALLISCHES FLUIDROHR," filed Aug. 21, 2023, which is incorporated herein by reference.

FIELD OF THE DISCLOSURE

The present disclosure relates to a metallic fluid tube, in particular a metallic fluid tube for a fluid connection arrangement, a fluid connection arrangement comprising a metallic fluid tube, and a method for producing a metallic fluid tube.

BACKGROUND

Different metal fluid tubes can be installed in a vehicle to conduct different types of fluid. In order to connect corresponding fluid tubes to further fluid-conducting components in a spatially limited installation space of a vehicle, fluid connection arrangements are used, through which fluid connections can be established between the respective fluid tube and the respective further fluid-conducting component.

Particularly in high-pressure applications, such as during the transport of gaseous fuels, for example during the transport of hydrogen, through corresponding metallic fluid tubes, high demands are placed on the fluid tightness between a corresponding fluid tube and a further fluid-conducting component within the corresponding fluid connection arrangement.

SUMMARY

It is the underlying object of the present disclosure to provide a metallic fluid tube for a fluid connection arrangement, which ensures a high fluid tightness of the connection.

This object is achieved by the subject matter with the features according to the independent claims. Advantageous examples of the present disclosure are the subject matter of the figures, the description and the dependent claims.

According to a first aspect of the present disclosure, the object is achieved by a metallic fluid tube for a fluid connection arrangement, comprising a metallic tube wall, which has a tube wall inner side which delimits an interior space of the fluid tube, and which has a tube wall outer side which faces away from the interior space of the fluid tube and faces an exterior area of the fluid tube, wherein the tube wall has a tube end with a tube opening which connects the interior space of the fluid tube to an exterior area of the metallic fluid tube, wherein the tube wall has an elevation which runs around the tube wall outer side and is arranged spaced apart from the tube end, wherein the tube wall outer side has a circumferential sealing geometry which is adapted to provide a fluid-tight connection between the metallic fluid tube and a further fluid-conducting component of the fluid connection arrangement, and wherein the circumferential sealing geometry extends on the tube wall outer side from the elevation to the tube end, and wherein the circumferential sealing geometry has turning grooves which extend along a groove extension direction, wherein the groove extension direction runs transversely to a longitudinal extension direction of the fluid tube.

In the present case, this is achieved in particular by the surface of the tube precursor, which then forms the circumferential sealing geometry in the metallic fluid tube, being machined during the manufacture of the metallic fluid tube with a turning tool that removes metal and thus ensures a correspondingly high quality of the sealing surface. The turning tool also introduces the turning grooves into the circumferential sealing geometry, which further improves the fluid tightness of the fluid connection.

This achieves the technical advantage, for example, that the turning grooves, which run around the circumferential sealing geometry of the metal tube wall transversely to the longitudinal direction of the fluid tube, enable an effective improvement in the fluid tightness of the fluid connection between the metal fluid tube and the further fluid-conducting component of the fluid connection arrangement. This is achieved in particular by the turning grooves being slightly raised so that a high surface pressure is achieved, thereby achieving a high sealing effect.

In particular, the turning grooves encircle the circumferential sealing geometry of the metallic tube wall at least in sections, in particular completely.

In particular, the turning grooves which encircle the sealing geometry are arranged spaced apart from each other along the longitudinal extension direction of the fluid tube.

For a corresponding fluid-tight design of the corresponding fluid connection, it is not only important to have a good mechanical design of the components connected to each other in a fluid-technical manner, but also to have a high quality of the sealing surface in terms of faultlessness.

By machining with the turning tool when producing the circumferential sealing geometry, any existing damage to the surface, such as impact marks, is also removed.

Thus, the metallic fluid tube with the corresponding advantageous circumferential sealing geometry or the corresponding fluid connection arrangement can be advantageously used for high-pressure applications for fuel lines, such as for the conduction of gaseous hydrogen.

In an advantageous example, the turning grooves are arranged on the entire circumferential sealing geometry, and the turning grooves are in particular arranged at least in sections on the elevation.

This achieves the technical advantage that an effective sealing surface is achieved over the entire area of the circumferential sealing geometry and adjacent areas, such as the elevation.

In an advantageous example, the turning grooves encircle the circumferential sealing geometry at least in sections, in particular completely.

This achieves the technical advantage that the sealing effect of the turning grooves is achieved over a large area of the circumference of the circumferential sealing geometry, in particular over the entire circumference.

In an advantageous example, the turning grooves run spirally around the circumferential sealing geometry, wherein the turning grooves in particular run spirally around the circumferential sealing geometry from the tube end in the direction of the elevation.

This achieves the technical advantage that a spiral course of the turning grooves, in particular from the tube end in the direction of the elevation, enables a particularly effective structure on the circumferential sealing geometry.

In an advantageous example, the turning grooves form elevations and depressions in the circumferential sealing geometry.

This achieves the technical advantage that the corresponding elevations and depressions formed by the turning grooves improve the sealing effect of the circumferential sealing geometry.

In particular, the elevations arranged next to one another are each spaced apart by a depression, and/or the depressions arranged next to one another are each spaced apart by an elevation.

In an advantageous example, an elevation front side of the elevation facing the tube end merges into the circumferential sealing geometry.

This achieves the technical advantage of achieving a homogeneous transition from the elevation to the circumferential sealing geometry.

In an advantageous example, a rear step and/or rear sphere is present on a rear side of the elevation facing away from the tube end, which a rear step and/or rear sphere connects the elevation rear side to a rear area of the tube wall outer side facing away from the tube end.

This achieves the technical advantage that the rear step and/or rear sphere on the rear side of the elevation enables an effective engagement of a threaded connector of the fluid connection arrangement, so that the metallic fluid tube can be advantageously connected to a further fluid-conducting component.

A rear sphere, especially if it is concentric to a spherical sealing surface, makes it possible to easily compensate for positional variations of the axis of the metal tube without impairing the sealing effect.

In an advantageous example, the fluid tube has a tube end outer diameter at the tube end, and wherein the fluid tube has an elevation outer diameter at the elevation which is greater than the tube end outer diameter, wherein the tube outer diameter of the circumferential sealing geometry is reduced, in particular reduced uniformly, from the elevation outer diameter to the tube end outer diameter.

This achieves the technical advantage that the outer diameter of the fluid tube increases from the tube end in the direction of the elevation, ensuring that the further fluid-conducting component is effectively abutted against the circumferential sealing geometry.

In an advantageous example, the fluid tube has a rear area outer diameter on a rear area of the tube wall outer side facing away from the tube end, which is smaller than the elevation outer diameter.

This achieves the technical advantage that the tapering of the fluid tube in the area behind the elevation as seen from the tube end enables an effective engagement behind the elevation by a threaded connector of the fluid connection arrangement.

In an advantageous example, the tube wall inner side at the tube end has a tapering which runs around the tube wall inner side and extends from the tube end to an area of the tube wall inner side which is spaced apart from the tube end.

This achieves the technical advantage that connecting components can be connected to the tapering in a fluid-tight manner, with which an overpressure can be introduced into the fluid tube without affecting the subsequent sealing geometry.

In an advantageous example, a trough running around the tube wall inner side is arranged in an area of the tube wall inner side that is spaced apart from the tube end.

This achieves the technical advantage that the corresponding trough is created by material being shifted from the tube wall inner side to the tube wall outer side during the forming process when producing the fluid tube, so that the elevation is advantageously formed on the tube wall outer side.

According to a second aspect of the present disclosure, the object is achieved by a fluid connection arrangement, comprising a metallic fluid tube according to the first aspect; a further fluid-conducting component, which abuts on the circumferential sealing geometry of the metallic fluid tube, wherein the further fluid-conducting component has a thread; and a threaded connector with a counter thread complementary to the thread of the further fluid-conducting component, wherein the threaded connector is connected to the further fluid-conducting component by a screw connection and is adapted to press the further fluid-conducting component onto the sealing geometry of the metallic fluid tube in order to provide a fluid-tight connection between the metallic fluid tube and the further fluid-conducting component.

This achieves the technical advantage that a fluid-tight fluid connection arrangement is obtained through the interaction of the threaded connector with the metallic fluid tube and the further fluid-conducting component.

According to a third aspect of the present disclosure, the object is achieved by a method for producing a metallic fluid tube with a circumferential sealing geometry, the method comprising the following method steps: providing a tube precursor with a metallic tube wall which has a tube wall inner side which delimits an interior space of the tube precursor, and which has a tube wall outer side which faces away from the interior space of the tube precursor and faces an exterior area of the tube precursor, wherein the tube wall has a tube end with a tube opening which connects the interior space of the tube precursor to an exterior area of the tube precursor; removing metal from the tube wall outer side of the metallic tube wall in an area of the tube wall outer side extending from the tube end of the tube precursor with a turning tool, removing metal from a tube edge of the tube wall outer side of the metallic tube wall delimiting the tube end with a cutting tool, and solid forming the tube precursor by means of a forming tool, wherein the metallic fluid tube is obtained, wherein the tube wall of the obtained metallic fluid tube has an elevation which runs around the tube wall outer side and is arranged spaced apart from the tube end, wherein the tube wall outer side has a circumferential sealing geometry which is adapted to provide a fluid-tight connection between the metallic fluid tube and a further fluid-conducting component of the fluid connection arrangement, and wherein the circumferential sealing geometry extends on the tube wall outer side from the elevation to the tube end, and wherein the circumferential sealing geometry has turning grooves which extend along a groove extension direction, wherein the groove extension direction runs transversely to a longitudinal extension direction of the fluid tube.

This achieves the technical advantage of providing a metallic fluid tube which has a particularly advantageous circumferential sealing geometry.

In an advantageous example, the method comprises the further method step, which is carried out between the removing of metal at the tube edge delimiting the tube end and the solid forming the tube precursor: introducing a circumferential tapering into the tube wall inner side at the tube end by means of a further cutting tool, wherein the circumferential tapering extends from the tube end to an area of the tube wall inner side spaced apart from the tube end.

This achieves the technical advantage that the circumferential tapering improves the fluid connection between the fluid tube and the further fluid-conducting component.

This achieves the technical advantage that connecting components can be connected to the tapering in a fluid-tight manner, with which an overpressure can be introduced into the fluid tube without affecting the subsequent sealing geometry.

In an advantageous example, the removing of metal on the tube wall outer side of the metallic tube wall, the removing of metal on a tube edge delimiting the tube end, and in particular the introduction of a circumferential tapering into the tube wall inner side at the tube end is carried out sequentially by a tool device which comprises the turning tool, the cutting tool, and in particular also the further cutting tool.

This achieves the technical advantage that the tool device enables an advantageous integration of several process steps using one component.

The advantageous examples described with respect to the metallic fluid tube according to the first aspect are also advantageous examples for the fluid connection arrangement according to the second aspect and for the method according to the third aspect.

Likewise, the advantageous examples of the method according to the third aspect are advantageous examples for the metallic fluid tube according to the first aspect and for the fluid connection arrangement according to the second aspect.

BRIEF DESCRIPTION OF THE DRAWINGS

Examples of the present disclosure are illustrated in the drawings and are described in more detail below.

DETAILED DESCRIPTION

Figure 1:
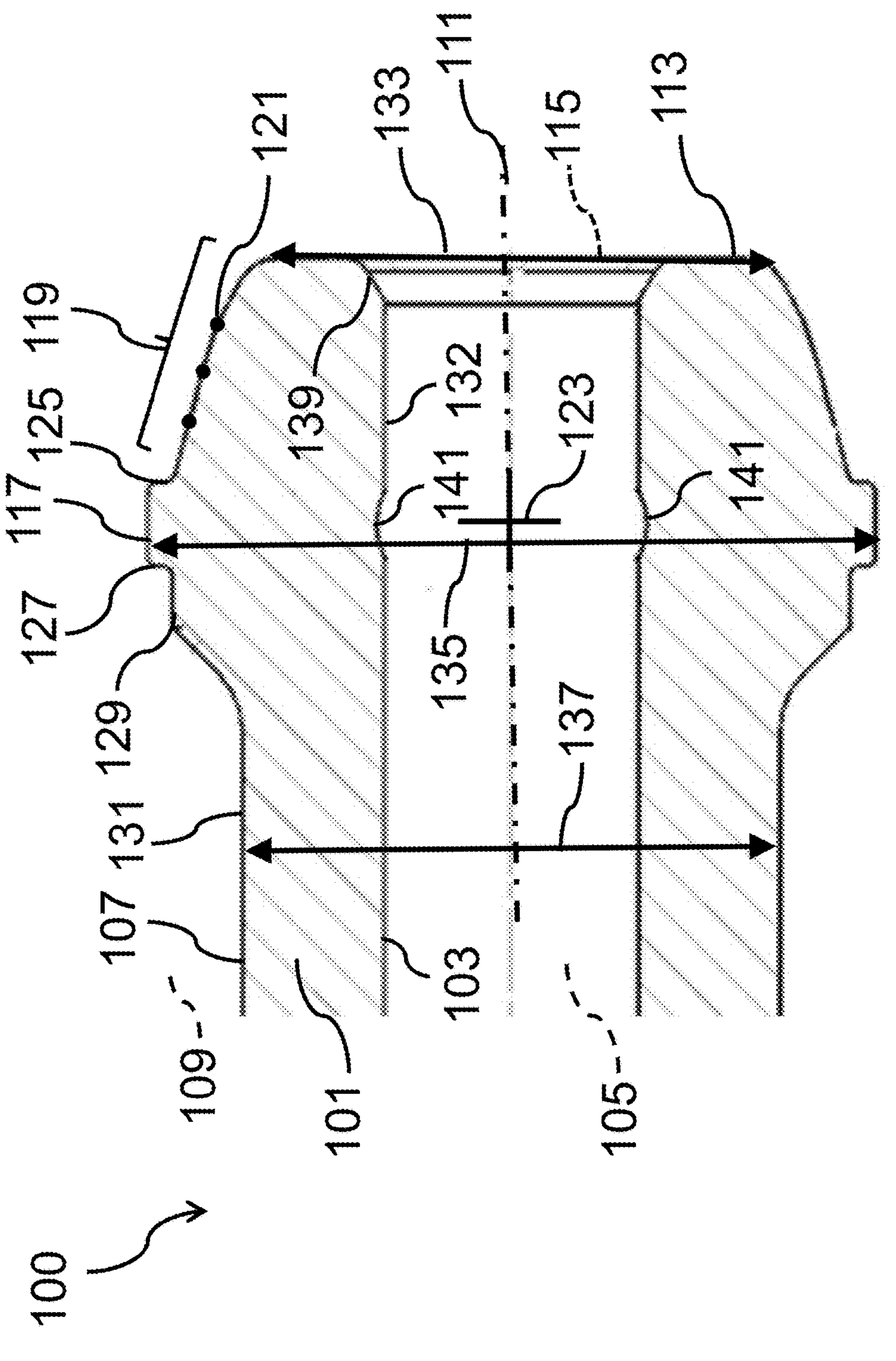
FIG. 1 shows a perspective view of a metallic fluid tube according to an example of the present disclosure.

FIG. 1 shows a perspective view of a metallic fluid tube according to an example of the present disclosure.

Figure 3:
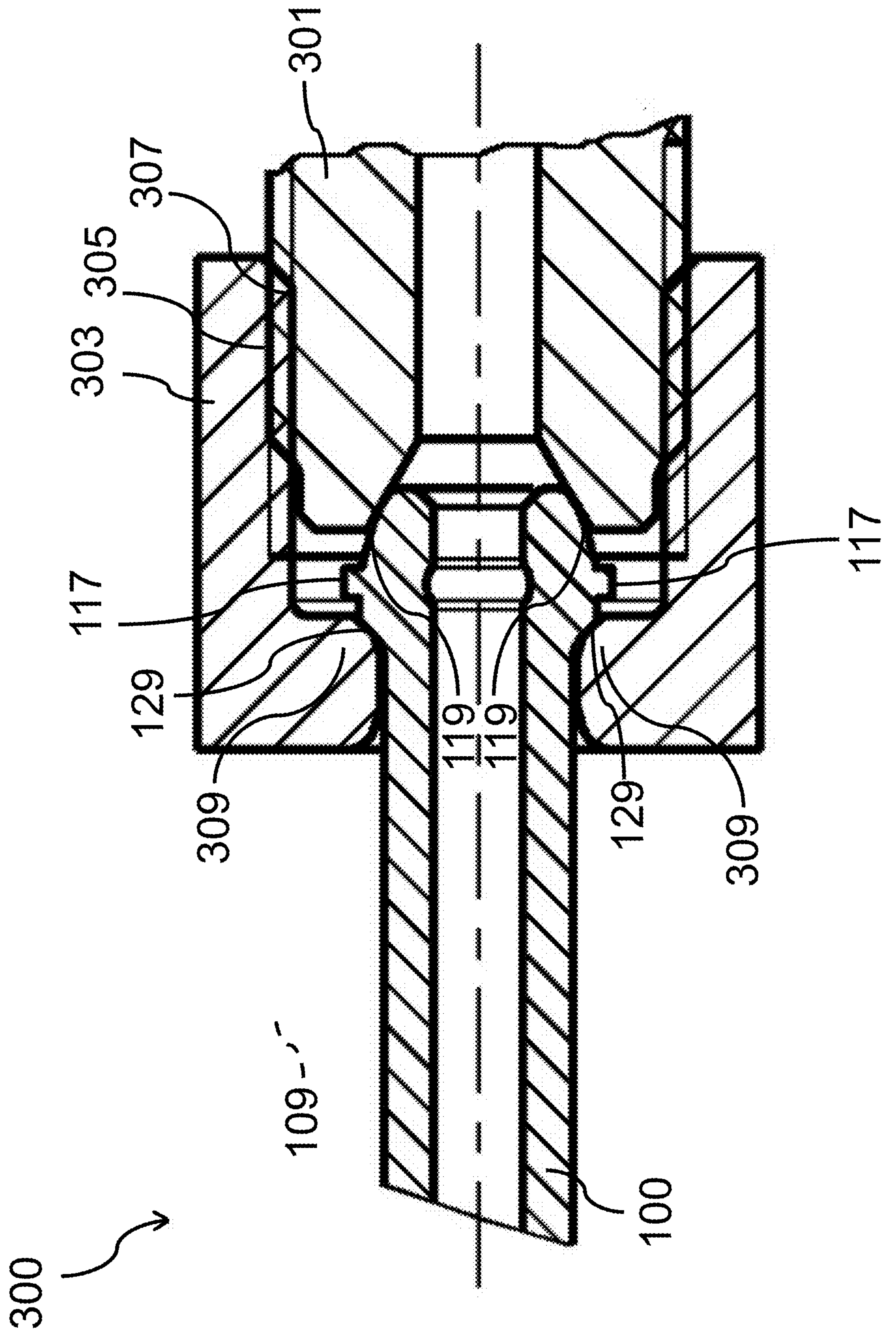
FIG. 3 shows a view of a fluid connection arrangement comprising a metallic fluid tube according to FIG. 1 and FIG. 2, which is connected to a further fluid-conducting component.

The metallic fluid tube 100 is used in the context of a fluid-tight fluid connection arrangement shown in FIG. 3. In particular, the metallic fluid tube 100 is used in a vehicle for conducting pressurized fluids, in particular gases, in particular hydrogen.

The metallic fluid tube 100 consists of a metal, in particular iron or steel.

The metallic fluid tube 100 comprises a metallic tube wall 101, which has a tube wall inner side 103, which delimits an interior space 105 of the fluid tube 100, and which has a tube wall outer side 107, which faces away from the interior space 105 of the fluid tube 100 and faces an exterior area 109 of the fluid tube 100. The metallic fluid tube 100 extends along a longitudinal extension direction 111.

The tube wall 101 has a tube end 113 with a tube opening 115 which connects the interior space 105 of the fluid tube 100 with the exterior area 109 of the metallic fluid tube 100.

The tube wall 101 has an elevation 117 which runs around the tube wall outer side 107 and is arranged spaced apart from the tube end 113.

The tube wall outer side 107 has a circumferential sealing geometry 119, which is adapted to provide a fluid-tight connection between the metallic fluid tube 100 and a further fluid-conducting component of the fluid connection arrangement not shown in FIG. 1. The circumferential sealing geometry 119 extends on the tube wall outer side 107 from the elevation 117 to the tube end 113.

Even if this is only shown schematically in FIG. 1, the circumferential sealing geometry 119 has turning grooves 121 which extend along a groove extension direction 123, wherein the groove extension direction 123 runs transversely to a longitudinal extension direction 111 of the fluid tube 100.

Even if this is not apparent in FIG. 1, the turning grooves 121 are arranged on the entire circumferential sealing geometry 119.

In particular, the turning grooves 121 encircle the circumferential sealing geometry 119 at least in sections, in particular completely.

In particular, the turning grooves 121 run spirally around the circumferential sealing geometry 119, more particular, the turning grooves 121 run spirally around the circumferential sealing geometry 119 from the tube end 113 in the direction of the elevation 117.

In particular, the turning grooves 121 form elevations and depressions in the circumferential sealing geometry 119.

Figure 2:
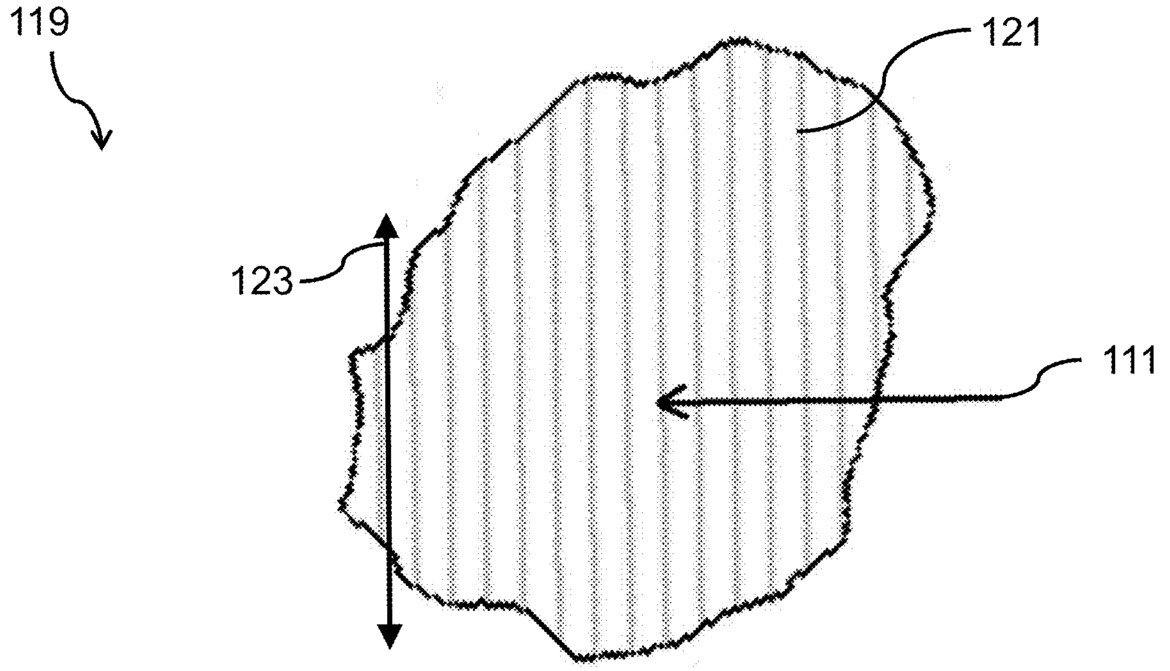
FIG. 2 shows an enlarged view of a circumferential sealing geometry of the metallic fluid tube shown in FIG. 1 according to an example of the present disclosure.

For further details of the circumferential sealing geometry 119 shown in FIG. 1, reference is made to the illustration in FIG. 2.

As can be seen from FIG. 1, an elevation front side 125 of the elevation 117 facing the tube end 113 merges into the circumferential sealing geometry 119.

As can be seen from FIG. 1, a rear step 129 is present on an elevation rear side 127 of the elevation 117 facing away from the tube end 113, which step 129 connects the elevation rear side 127 with a rear area 131 of the tube wall outer side 107 facing away from the tube end 113.

The fluid tube 100 has a tube end outer diameter 133 at the tube end 113. The fluid tube 100 has an elevation outer diameter 135 at the elevation 117, which is greater than the tube end outer diameter 133, wherein the tube outer diameter of the circumferential sealing geometry 119 is reduced, in particular reduced uniformly, from the elevation outer diameter 135 to the tube end outer diameter 133.

The fluid tube 100 has a rear area outer diameter 137 on a rear area 131 of the tube wall outer side 107 facing away from the tube end 113, which is smaller than the elevation outer diameter 135.

The tube wall inner side 103 has at the tube end 113 a tapering 139 which runs around the tube wall inner side 103 and extends from the tube end 113 to an area 132 of the tube wall inner side 103 spaced apart from the tube end 113.

In the area 132 of the tube wall inner side 103 spaced apart from the tube end 113, a trough 141 is arranged, which runs around the tube wall inner side 103.

FIG. 2 shows an enlarged view of a circumferential sealing geometry of the metallic fluid tube shown in FIG. 1 according to an example of the present disclosure.

In FIG. 2 a schematic representation of a section of a circumferential sealing geometry 119, arranged on the tube wall outer side 107 between the elevation 117 and the tube end 113, of the metallic fluid tube 100 shown in FIG. 1 is shown.

FIG. 2 shows a schematic representation of the longitudinal extension direction 111 of the fluid tube 100. As shown in FIG. 2, the turning grooves 121 arranged on the circumferential sealing geometry 119 extend along the groove extension direction 123 transversely to the longitudinal extension direction 111 of the fluid tube 100.

It can be seen from FIG. 2 that the turning grooves 121 are arranged spaced apart from each other on the circumferential sealing geometry 119.

Even if only a section of the circumferential sealing geometry 119 of the fluid tube 100 is shown in FIG. 2, the turning grooves 121 encircle the circumferential sealing geometry 119 at least in sections, in particular completely.

FIG. 3 shows a view of a fluid connection arrangement comprising a metallic fluid tube according to FIG. 1 and FIG. 2, which is connected to a further fluid-conducting component.

FIG. 3 shows the metallic fluid tube 100 of the fluid connection arrangement 300 already shown in FIGS. 1 and 2, wherein reference is made here to the extensive explanations for FIGS. 1 and 2, and wherein, for reasons of clarity, only the circumferential sealing geometry 119 of the metallic fluid tube 100 is marked in FIG. 3.

The fluid connection arrangement 300 shown in FIG. 3 has a further fluid-conducting component 301, which abuts on the circumferential sealing geometry 119 of the metallic fluid tube 100.

In order to achieve a fluid-tight connection between the metallic fluid tube 100 and the further fluid-conducting component 301 within the fluid connection arrangement 300, the metallic fluid tube 100 and the fluid-conducting component 301 have to be pressed against one another.

This is achieved by a threaded connector 303 of the fluid connection arrangement 300 shown in FIG. 3. The threaded connector 303 has a counter thread 305, shown only schematically in FIG. 3, in an area facing the further fluid-conducting component 301, which is complementary to a thread 307, shown only schematically in FIG. 3, in an area of the further fluid-conducting component 301 facing the threaded connector 303. The threaded connector 303 can therefore be screwed onto the further fluid-conducting component 301 as part of a screw connection.

The threaded connector 303 further comprises a pressing area 309 which engages behind the elevation 117 of the metallic fluid tube 100 shown in FIG. 3, in particular the rear step 129 of the elevation 117.

When the threaded connector 303 is screwed onto the further fluid-conducting component 301, the pressing area 309 of the threaded connector 303 is pressed against the metallic fluid tube 100, so that a press connection is obtained between the sealing geometry 119 of the metallic fluid tube 100 and the further fluid-conducting component 301, and thereby a fluid-tight connection is provided between the metallic fluid tube 100 and the further fluid-conducting component 301.

Figure 4:
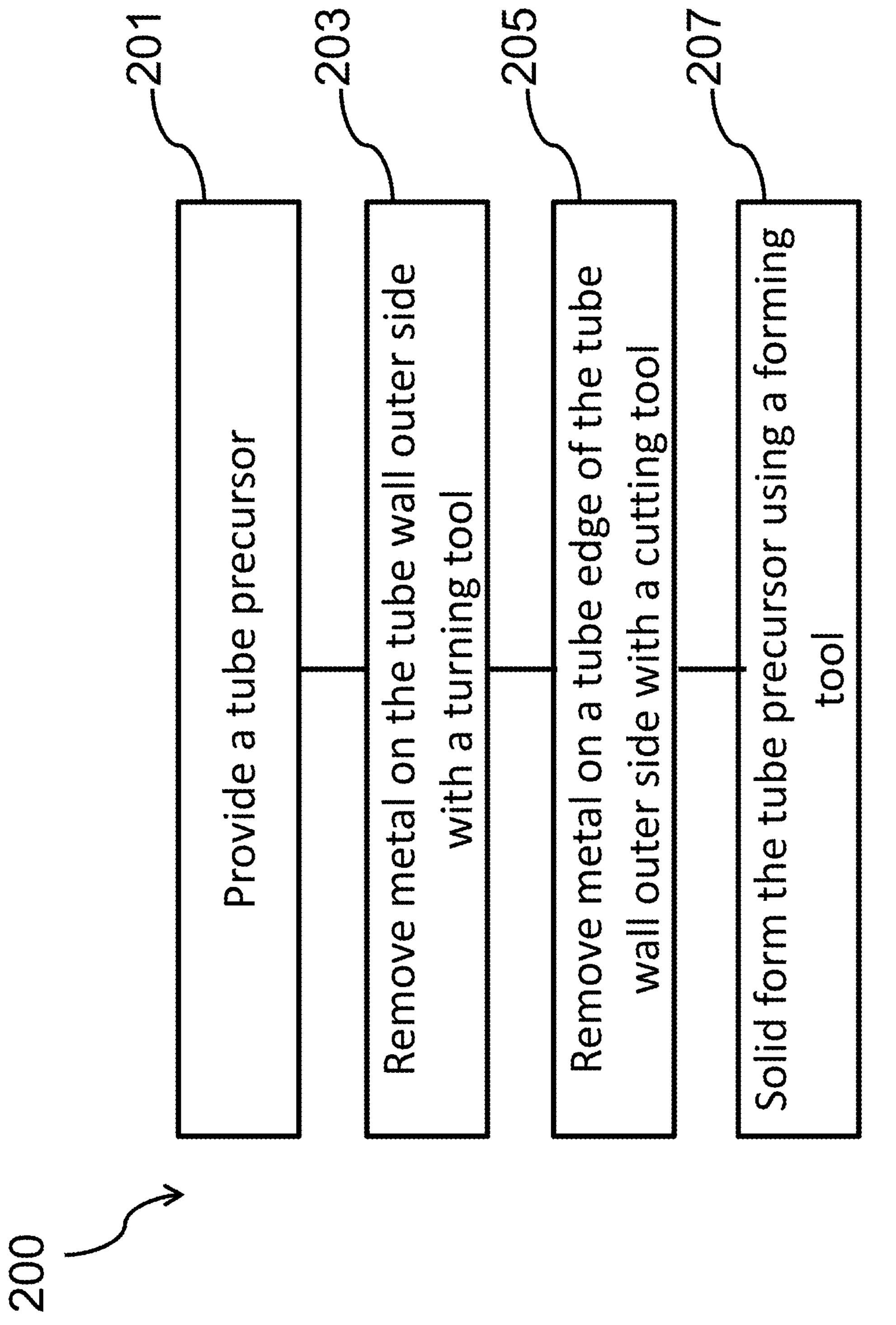
FIG. 4 shows a method for producing a metallic fluid tube according to an example.

FIG. 4 shows a method for manufacturing a metallic fluid tube according to an example.

The method 200 comprises, as a first method step, the providing 201 of a tube precursor 143 with a metallic tube wall 101, which has a tube wall inner side 103 which delimits an interior space 105 of the tube precursor 143, and which has a tube wall outer side 107 which faces away from the interior space 105 of the tube precursor 143 and faces an exterior area 109 of the tube precursor 143, wherein the tube wall 101 has a tube end 113 with a tube opening 115 which connects the interior space 105 of the tube precursor 143 to an exterior area 109 of the tube precursor 143.

The method 200 comprises, as a second method step, the removing 203 of metal on the tube wall outer side 107 of the metallic tube wall 101 in an area 131 of the tube wall outer side 107 extending from the tube end 113 of the tube precursor 143 with a turning tool 151.

The method 200 comprises, as a third method step, the removing 205 of metal on a tube edge of the tube wall outer side 107 of the metallic tube wall 101, which edge delimits the tube end 113, with a cutting tool.

The method 200 comprises, as a fourth method step, the solid forming 207 of the tube precursor 143 by means of a forming tool, wherein the metallic fluid tube 100 is obtained, wherein the tube wall 101 of the obtained metallic fluid tube 100 has an elevation 117 which runs around the tube wall outer side 107 and is arranged spaced apart from the tube end 113, wherein the tube wall outer side 107 has a circumferential sealing geometry 119 which is adapted to provide a fluid-tight connection between the metallic fluid tube 100 and a further fluid-conducting component 301, and wherein the circumferential sealing geometry 119 extends on the tube wall outer side 107 from the elevation 117 to the tube end 113, and wherein the circumferential sealing geometry 119 has turning grooves 121 which extend along a groove extension direction 123, wherein the groove extension direction 123 runs transversely to a longitudinal extension direction 111 of the fluid tube 100.

In particular, the method comprises the further method step, which is carried out between the removing 205 of metal on the tube edge delimiting the tube end 113 and the solid forming 207 of the tube precursor 143: introducing a circumferential tapering 139 into the tube wall inner side 103 at the tube end 113 by means of a further cutting tool, wherein the circumferential tapering 139 extends from the tube end 113 to an area 132 of the tube wall inner side 103 spaced apart from the tube end 113.

In particular, the removing 203 of metal on the tube wall outer side 107 of the metallic tube wall 101, the removing 205 of metal on a tube edge delimiting the tube end 113, and in particular the introduction of a circumferential tapering 139 into the tube wall inner side 103 at the tube end 113 are carried out sequentially by a tool device which comprises the turning tool 151, the cutting tool, and in particular also the further cutting tool. The turning tool 151, the cutting tool, and in particular also the further cutting tool can thus be advantageously integrated into the tool device.

Figure 5B:
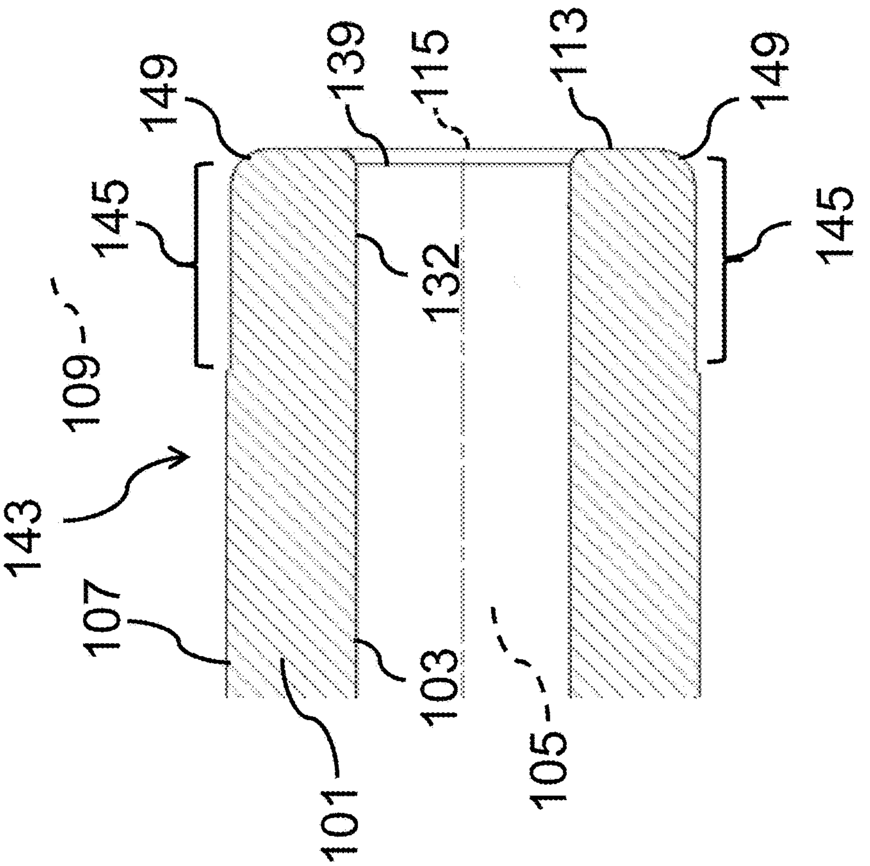
FIGS. 5A and 5B show a tube precursor before and after metal removing, respectively, according to an example.
Figure 5A:
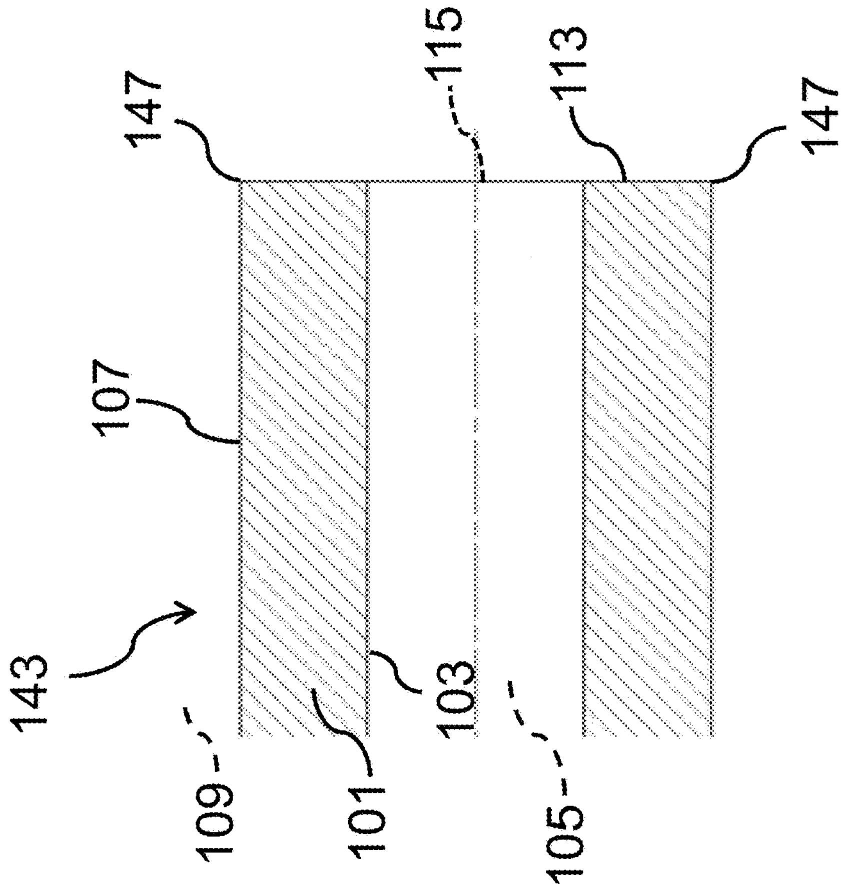

FIGS. 5A and 5B show a tube precursor before and after metal removing, respectively, according to one example.

In FIG. 5A, a tube precursor 143 according to an example is shown, which is provided according to the method 200 described in FIG. 4 for producing a metallic fluid tube 100 at the beginning of the manufacturing process.

The tube precursor 143 has a metallic tube wall 101, which in turn has a tube wall inner side 103, which delimits an interior space 105 of the tube precursor 143, and which has a tube wall outer side 107, which faces away from the interior space 105 of the tube precursor 143 and faces an exterior area 109 of the tube precursor 143. The tube wall 101 has a tube end 113 with a tube opening 115, which connects the interior space 105 of the tube precursor 143 with the exterior area 109 of the tube precursor 143.

After the providing 201 of the tube precursor 143 according to the method 200 described in FIG. 4, the next method step is the removing 203 of metal on the tube wall outer side 107 of the metallic tube wall 101 in an area 145 of the tube wall outer side 107 extending from the tube end 113 of the tube precursor 143 using a turning tool 151, wherein the corresponding area 145 is highlighted in the tube precursor 143 shown in FIG. 5B.

The turning tool 151 comprises in particular a turning chisel, in particular with a shapeless cutting edge 155, by means of which metal is removed in the corresponding area 145 and a new surface is provided which, at the end of the manufacturing process, corresponds to the circumferential sealing geometry 119 of the metallic fluid tube 100.

By removing metal by the turning tool 151, the turning grooves 121 already described in detail with reference to FIGS. 1 and 2 are introduced into the corresponding area 145, which ensure a corresponding fluid-tight connection of the metallic fluid tube 100 with the further fluid-conducting component 301 in the corresponding circumferential sealing geometry 119 of the metallic fluid tube 100.

Figure 6:
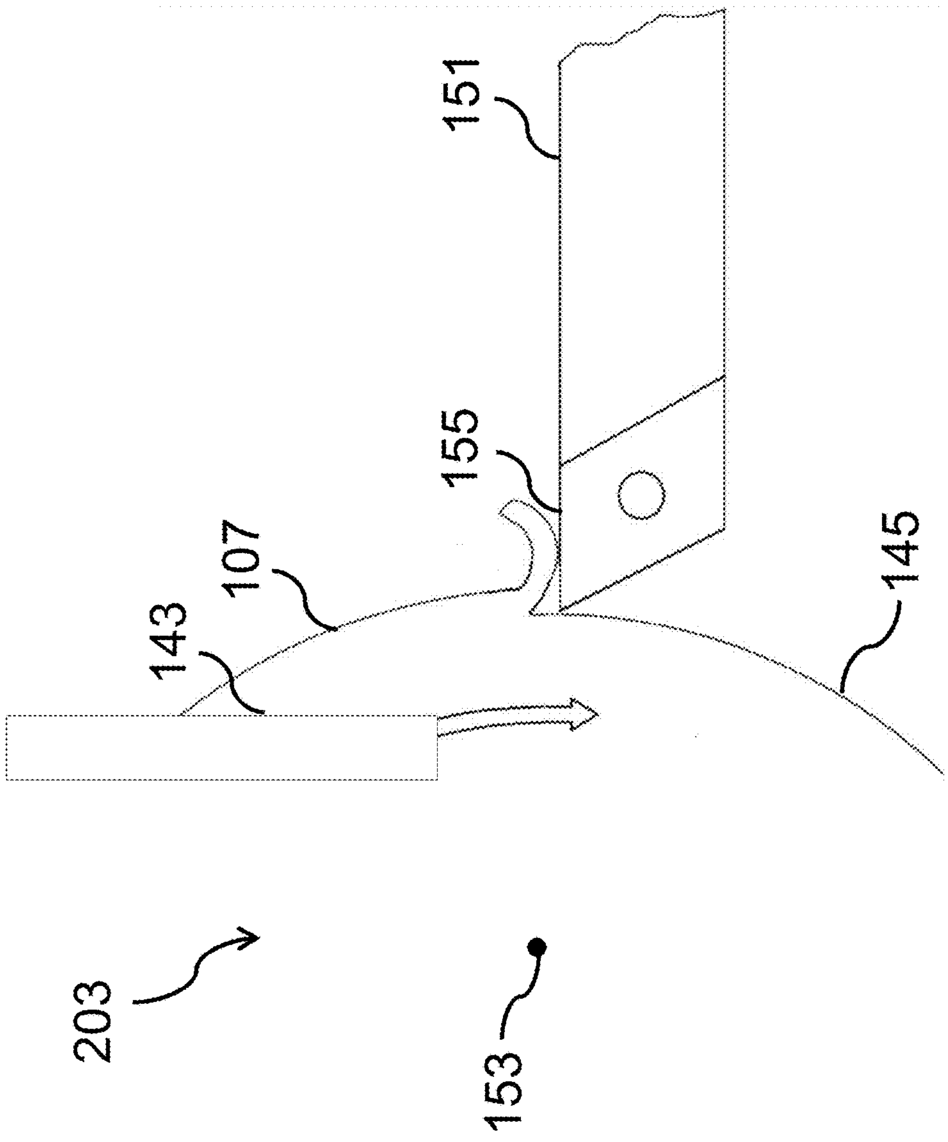
FIG. 6 shows a schematic view of removing metal from a tube precursor using a turning tool according to an example.

For further details regarding the removing of metal by means of the turning tool 151, reference is made to the following explanations of FIG. 6.

According to the method 200 described in FIG. 4, the next method step then follows, comprising the removing 205 of metal on a tube edge 147, which delimits the tube end 113, of the tube wall outer side 107 of the metallic tube wall 101 with a cutting tool. The corresponding tube edge 147 is shown in FIG. 5A. And the corresponding rounded area 149 of the removed tube edge 147 is shown schematically in FIG. 5B.

The cutting tool comprises in particular a shaped cutting edge by means of which a machining process is made possible.

Even if this is not shown in FIG. 4, the subsequent, optional, method step is to introduce a circumferential tapering 139 into the tube wall inner side 103 at the tube end 113 using a further cutting tool, wherein the circumferential tapering 139 extends from the tube end 113 to an area 132 of the tube wall inner side 103 spaced apart from the tube end 113. The circumferential tapering 139 in the tube precursor 143 is shown in FIG. 5B.

Subsequently, the last method step described in accordance with FIG. 4 is the solid forming 207 of the tube precursor 143 shown in FIG. 5B by means of a forming tool, wherein the metallic fluid tube 100 shown in FIG. 1 is obtained.

FIG. 6 shows a schematic view of removing metal from a tube precursor using a turning tool according to an example.

FIG. 6 shows the second method step of the manufacturing method 200 of the metallic fluid tube 100, which is shown only schematically in FIG. 4 and which comprises: the removing 203 of metal on the tube wall outer side 107 of the metallic tube wall 101 in an area 145 of the tube wall outer side 107 extending from the tube end 113 of the tube precursor 143, using a turning tool 151.

As shown only schematically in FIG. 6, the tube precursor 143 rotates about a rotation axis 153 and the turning tool 151 with a shapeless cutting edge 155 moves parallel to the rotation axis 153 along the tube wall outer side 107 of the metallic tube wall 101 and cuts out a new surface in the area 145 extending from the tube end 113 of the tube precursor 143.

Due to the contact with the turning tool 151, the new surface in the area 145 has corresponding turning grooves 121, not shown in FIG. 6, which extend along a groove extension direction 123, which is orthogonal to the longitudinal extension direction 111 of the tube precursor 143.

The new surface with the turning grooves 121 in the area 145 provides the circumferential sealing geometry 119 in the metallic fluid tube 100.

All features explained and shown in connection with individual examples of the present disclosure can be provided in different combinations in the subject-matter of the present disclosure in order to simultaneously realize their advantageous effects.

The scope of the present disclosure is given by the claims and is not limited by the features explained in the description or shown in the figures.

LIST OF REFERENCE SIGNS

100 Metallic fluid tube
101 Metallic tube wall
103 Tube wall inner side
105 Interior space of the fluid tube
107 Tube wall outer side
109 Exterior area of the fluid tube
111 Longitudinal extension direction of the fluid tube
113 Tube end
115 Tube opening
117 Elevation
119 Circumferential sealing geometry
121 Turning grooves
123 Groove extension direction
125 Elevation front side
127 Elevation back side
129 Rear step
131 Rear area of the tube wall outer side
132 Area of the tube wall inner side spaced apart from the tube end
133 Tube end outer diameter
135 Elevation outer diameter
137 Rear area outer diameter
139 Tapering
141 Trough
143 Tube precursors
145 Area of the tube wall outer side extending from the tube end of the tube precursor
147 Tube edge
149 Rounded area of the removed tube edge
151 Turning tool
153 Rotation axis of the tube precursor
155 Shapeless cutting edge of the turning tool
200 Method for manufacturing a metallic fluid tube
201 First method step: providing a tube precursor
203 Second method step: removing metal with a turning tool
205 Third method step: removing metal with a cutting tool
207 Fourth method step: solid forming the tube precursor
300 Fluid connection arrangement
301 Further fluid-conducting component
303 Threaded connector
305 Counter thread of the threaded connector
307 Thread of the further fluid-conducting component
309 Pressing area of the threaded connector

What is claimed is:

1. A fluid connection arrangement comprising a metallic fluid tube and further comprising:

a further fluid-conducting component which abuts on a circumferential sealing geometry of the metallic fluid tube, wherein the further fluid-conducting component has a thread; and a threaded connector comprising a counter thread complementary to the thread of the further fluid-conducting component, wherein the threaded connector is connected to the further fluid-conducting component by a screw connection and is adapted to press the further fluid-conducting component onto the circumferential sealing geometry of the metallic fluid tube, so that a press connection is obtained between the circumferential sealing geometry of the metallic fluid tube and the further fluid-conducting component, and thereby a fluid-tight press connection is formed between the metallic fluid tube and the further fluid-conducting component, the metallic fluid tube comprising:

a metallic tube wall comprising a tube wall inner side which delimits an interior space of the metallic fluid tube and a tube wall outer side which faces away from the interior space of the metallic fluid tube and faces an exterior area of the metallic fluid tube, wherein the metallic tube wall comprises a tube end with a tube opening which connects the interior space of the metallic fluid tube with the exterior area of the metallic fluid tube, wherein the metallic tube wall has an elevation which runs around the tube wall outer side and is arranged such that the elevation is spaced apart from the tube end, wherein the tube wall outer side has the circumferential sealing geometry which is adapted to provide a fluid-tight connection between the metallic fluid tube and the further fluid-conducting component of the fluid connection arrangement, and wherein the circumferential sealing geometry extends on the tube wall outer side from the elevation to the tube end, wherein the circumferential sealing geometry has turning grooves which extend along a groove extension direction, wherein the groove extension direction runs transversely to a longitudinal extension direction of the metallic fluid tube, wherein the turning grooves run spirally around the circumferential sealing geometry from the tube end in a direction of the elevation, wherein the turning grooves which encircle the circumferential sealing geometry are arranged spaced apart from each other along the longitudinal extension direction of the metallic fluid tube, wherein the turning grooves are formed as raised grooves on the circumferential sealing geometry to achieve a high surface pressure, and wherein the turning grooves are arranged on an entirety of the circumferential sealing geometry, and wherein the turning grooves are arranged at least in sections on the elevation.

2. The fluid connection arrangement according to claim 1, wherein the turning grooves encircle the circumferential sealing geometry completely at least in sections.

3. The fluid connection arrangement according to claim 1, wherein the turning grooves form elevations and depressions in the circumferential sealing geometry.

4. The fluid connection arrangement according to claim 1, wherein an elevation front side of the elevation facing the tube end merges into the circumferential sealing geometry.

5. The fluid connection arrangement according to claim 1, wherein a rear step is present on an elevation rear side of the elevation facing away from the tube end, wherein the rear step connects the elevation rear side to a rear area of the tube wall outer side facing away from the tube end.

6. The fluid connection arrangement according to claim 1, wherein the metallic fluid tube has a tube end outer diameter at the tube end, and wherein the metallic fluid tube has an elevation outer diameter at the elevation, wherein the elevation outer diameter is greater than the tube end outer diameter, wherein a tube outer diameter of the circumferential sealing geometry is reduced uniformly from the elevation outer diameter to the tube end outer diameter.

7. The fluid connection arrangement according to claim 6, wherein the metallic fluid tube has a rear area outer diameter on a rear area of the tube wall outer side facing away from the tube end, wherein the rear area outer diameter is smaller than the elevation outer diameter.

8. The fluid connection arrangement according to claim 1, wherein the tube wall inner side at the tube end has a tapering which runs around the tube wall inner side and extends from the tube end to an area of the tube wall inner side spaced apart from the tube end.

9. The fluid connection arrangement according to claim 1, wherein a trough running around the tube wall inner side is arranged in an area of the tube wall inner side spaced apart from the tube end.

* * * * *